May 25, 1948.  E. E. LLOYD  2,442,243

END FASTENER FOR TIRE CHAINS

Filed March 29, 1943

INVENTOR,
Eldon E. Lloyd.
BY
Roy E. Hamilton,
Attorney.

Patented May 25, 1948

2,442,243

UNITED STATES PATENT OFFICE 2,442,243

END FASTENER FOR TIRE CHAINS

Eldon E. Lloyd, Maryville, Mo.

Application March 29, 1943, Serial No. 481,060

3 Claims. (Cl. 24—230.5)

This invention relates to improvements in fasteners for tire chains and has particular reference to a fastening suitable for joining together the ends of the side chains of the tire chains.

The principal object of the present invention is the provision of a side chain fastening means made of a single piece of wire formed to present a link engaging portion which will preclude accidental disengagement of said link from the fastener.

A further object of the invention is the provision of chain fastening means which is so constructed as to require the twisting of the chain from its normal position while positioning it on the fastener hook.

Other objects are simplicity and economy of construction, ease and convenience of operation and adaptability for use in joining together the ends of link chains of various types.

Reference will now be had to the drawing wherein.

Figure 1:
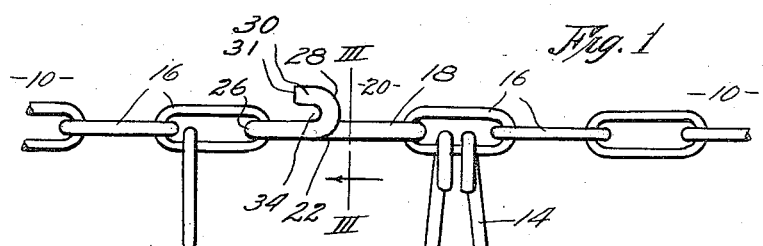
Fig. 1 is a side elevation of a portion of a tire chain embodying the present invention.

Throughout the several views like reference numbers refer to similar parts and the numeral 10 designates the side chain of an automobile anti-skid chain of standard construction which carries one end of cross chain 12 by connecting link 14. For the purpose of installing the chain on the tire it is necessary that the side chain be split and provided with a fastening means which can be easily operated to secure the chain on the tire or to remove the chain.

The side chains are usually made of interlocking welded links 16 of uniform size and shape in linear form and of the proper length to substantially circumscribe the wheel rim.

The end link 16 of chain 10 is interlocked with the eye 18 of the fastener 20. This fastener 20 is made of a single strand of relatively large wire formed to present an eye 18 and a body member 22. The eye may be welded closed to preclude opening or otherwise formed to present a proper connection with link 16.

Figure 2:
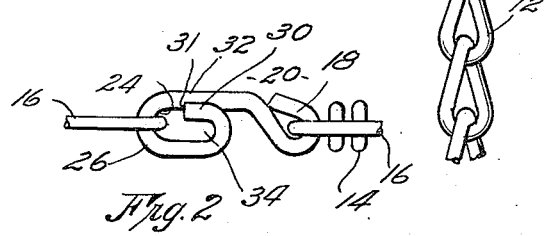
Fig. 2 is an enlarged fragmentary plan view showing the fastening means in the operative position.
Figure 3:
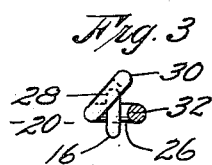
Fig. 3 is a sectional view taken on line III—III of Figure 1.

The body member 22 is bent at 24 to present a hook 26 and the free end portion of the wire is rebent at 28 to provide a forward projection 30 which serves to limit the movement of link 16 engaged in hook 26 as shown in Figs. 1, 2 and 3. It will be noted that the rebend 28 is in a plane disposed at an acute angle to the plane of the hook 26 so that the end 31 of the wire strand is positioned adjacent the body portion 32 of the wire strand so that the space therebetween is only slightly greater than the diameter of the wire forming the link 16. This structure precludes to a large degree the chance of accidental displacement of the link of the side chain from the hook.

The link in its natural movement from the hook engaging position would be to enter the recess 34 formed by the rebent, thus preventing its disengagement from the hook. Due to the position of the parts the chances are very remote that the link 16 would be positioned so that it would pass between the wire end 31 and the body 32.

Figure 4:
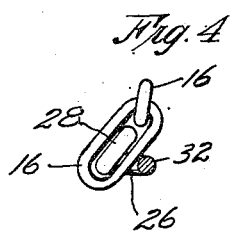
Fig. 4 is a view similar to that shown in Fig. 3 with the attaching chain link shown as it is being positioned on the fastener.

Referring to Figure 4 it will be noted that when the chain link 16 is being positioned on or removed from the hook, it must be slightly twisted from its natural position as shown.

When in use the fastener member is positioned with its unbent portion disposed outwardly from the body of the tire to prevent unnecessary wear.

Figure 5:
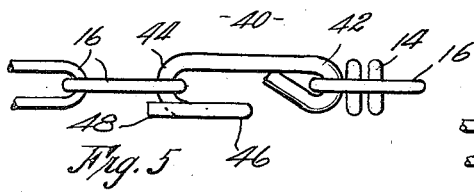
Fig. 5 is a plan view of a modified form of the fastener shown in the operative position on the chain.
Figure 6:
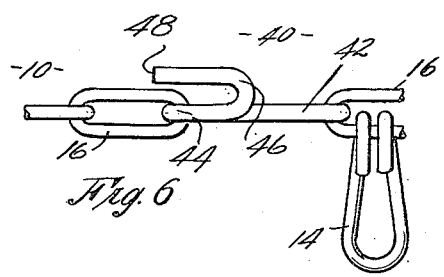
Fig. 6 is an elevational view of the fastener shown in Fig. 5.

The modified form shown in Figs. 5 and 6 provides for a similar hook member 40 made of a single strand of wire formed at its one end to present an eye 42 to interlock with link 16 and the end portion thereof is rebent at 46 to present an outwardly extending end portion 48 which extends beyond the outer extremity of hook 44.

The plane of the rebend is shown as being at a right angle to the plane of the hook, however, it might be at an acute or obtuse angle thereto without departing from the general structure.

Should the side chain link 16 move rearwardly on the hook for disengagement then the protruding end portion 48 would prevent disengagement of the link from the hook. When the link is positioned on the hook it must first be turned at an angle of 90 degrees from its normal position to pass over the rebent portion 46.

Figure 7:
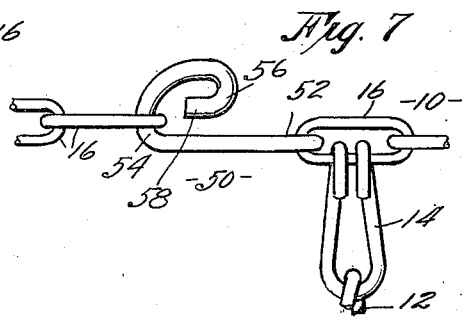
Fig. 7 is a side elevational view of another modified form of the fastener shown in the operating position on the chain.
Figure 8:
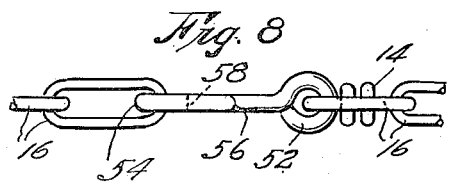
Fig. 8 is a plan view of the fastener shown in Fig. 7.

Referring now to Figs. 7 and 8 wherein is shown a further modified form of the fastener, it will be noted this fastener 50 is also made of a single strand of wire having an attaching eye 52 at its one end, a hook 54 formed intermediate its ends and provided at its free end with a rebent portion 56 with the end portion 58 extending between the body portions of the wire and in a common plane with the hook. The length of the rebend is such that link 16 cannot be accidentally moved thereover for disengagement.

It is quite apparent that these chain fastening means shown and described are so constructed as to be easily and quickly attached or detached manually but will not be easily detached accidentally when the chain is in operative position on the moving wheel.

While the drawing shows a round wire for making the parts of the end fastener for tire chains, it is not intended to limit the making of the fastener to the ordinary round wire shown, but is intended to include any elongated member formed by drawing, stamping, forging or by any other method.

What I claim as new and desire to protect by Letters Patent is:

1. A fastener for the side chain of a tire chain comprising a single strand of wire formed to present an eye at its one end portion to interlock with a link at one end of said side chain, said wire being formed adjacent its opposite end to present an open hook in the plane of said eye to receive a link at the other end of said side chain, the free end portion of said wire strand being rebent to extend outwardly from said eye with the plane thereof disposed at an acute angle to the major plane of said hook.

2. A fastener for the side chain of a tire chain comprising a single wire strand provided at its one end with an eye to interlock with a link at one end of said side chain, an open hook formed intermediate the ends of said wire strand adapted to removably engage a link at the other end of said side chain, and a return bend formed at the hook end portion of said wire strand to lie at an acute angle to the plane of and directly above said hook.

3. A fastener for the side chain of a tire chain comprising an elongated rigid member provided at its one end with an eye to interlock with a link at one end of said side chain, an open hook formed intermediate the ends of said member in the major plane of said eye adapted to engage a link at the other end of said side chain and a return bend formed at the end portion of said elongated member with its free end portion positioned in a plane disposed at an acute angle to the plane of said eye and intermediate the strands of said open hook to interfere with accidental movement of said link from said hook.

ELDON E. LLOYD.

REFERENCES CITED

The following references are of record in the file of this patent:

UNITED STATES PATENTS

| Number | Name | Date |
|---|---|---|
| D. 30,178 | Crawford | Feb. 14, 1899 |
| 278,469 | Thompson | May 29, 1883 |
| 399,831 | Burson | Mar. 19, 1889 |
| 545,043 | Attwood et al. | Aug. 27, 1895 |
| 1,271,202 | Mueller | July 2, 1918 |
| 1,426,176 | Gardner | Aug. 15, 1922 |
| 1,511,002 | Pfautz | Oct. 7, 1924 |
| 1,617,627 | Frambach | Feb. 15, 1927 |
| 2,016,756 | Taylor | Oct. 8, 1935 |